Figure 6:
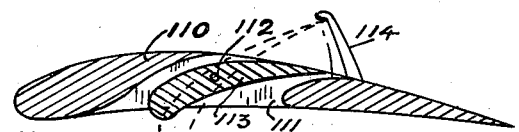

Aug. 13, 1929.  L. H. CROOK  1,724,456
AERODYNAMIC CONTROL OF AIRPLANE WINGS
Original Filed April 24, 1928  2 Sheets-Sheet 1
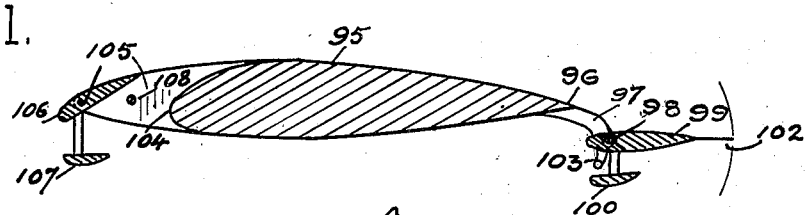
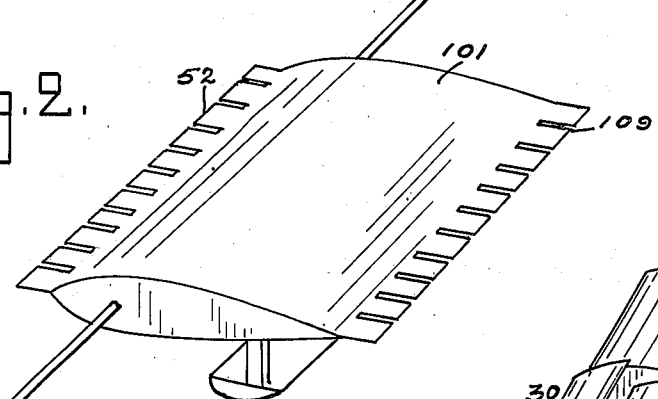
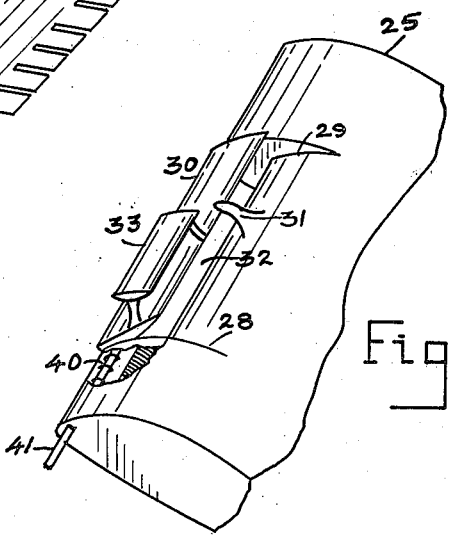
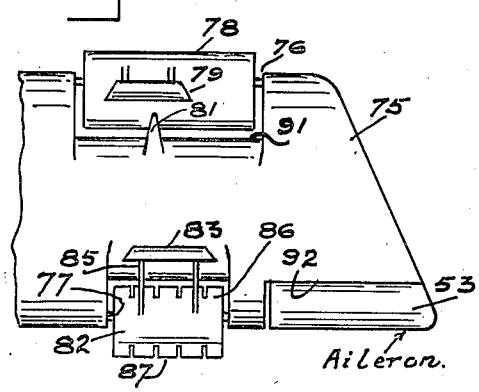
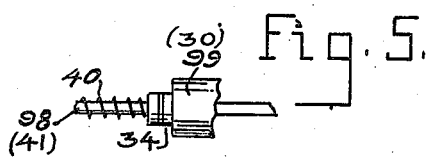
INVENTOR.
LOUIS H. CROOK.
BY
Herman Jakobsson
ATTORNEY.

Aug. 13, 1929.  L. H. CROOK  1,724,456

AERODYNAMIC CONTROL OF AIRPLANE WINGS

Original Filed April 24, 1928   2 Sheets-Sheet 2

INVENTOR.
BY Louis H. Crook.
Herman Jakobsson
ATTORNEY.

Patented Aug. 13, 1929.

1,724,456

UNITED STATES PATENT OFFICE.

LOUIS H. CROOK, OF WASHINGTON, DISTRICT OF COLUMBIA.

AERODYNAMIC CONTROL OF AIRPLANE WINGS.

Original application filed April 24, 1928, Serial No. 272,518. Divided and this application filed May 25, 1929. Serial No. 365,979.

The present invention relates to a device for aerodynamically controlling air plane wings and forms a division of my pending application Ser. No. 272,518, filed Apr. 24, 1928, for aerodynamic wing control. The device consists of freely moving vanes on the main wing of an aircraft, functioning by their own aerodynamic characteristics to influence the air flow across the entire wing system. This device is not operated by the pilot or any mechanical means, neither does it depend on the orientation of the machine with the earth, but is actuated by the change in the air flow itself, thereby controlling the general flow of air over the wing system.

The controlling aerodynamic forces acting on the vanes may thus cause a neutral, a stable or an unstable rotational movement about the axis of rotation of the vanes. In normal attitude of flight these vanes are remarkably stable, but in a sudden "stall" they become unstable and will swing instantly, thereby correcting the air flow so as to gradually bring the wing back to normal flight conditions. Accordingly the vanes function to produce ideal conditions for normal flight and to correct dangerous conditions at the time of a stall and for all abnormal flights in general.

In some cases I provide small auxiliary blades rigidly secured on the main vane or in other words, furnish double or triple vanes. These blades produce a stabilizing effect on the main vane. The vanes may be placed either in the middle of the wing or near its trailing or leading edges, in order to correct at the start such dangerous troubles as spins, stalls, burbles and the like, in other words, the vanes are placed at the most economical position of the wing and create great changes in directing the path of the air.

As already stated, the vanes function automatically and unaided by the pilot, and accordingly the disturbances are immediately corrected at the point of the wing where they occur and independent of corrections of other disturbances at other points of the wing.

In order to prevent a too rapid change from one position to another of the vanes a friction device for the same is preferably provided. Another feature of this invention is the provision of feathered front and rear edges on the vanes in order to cause the vanes to make a yielding resistance against the attacking air, and these feathered edges are preferably fingered to permit more flexing at one end than at the other in case that the air attacks with unequal force at both ends.

The present invention relates particularly to vanes placed in openings provided in the middle of the wing and in such a manner that the openings may be completely closed in some cases and open in other cases to permit the air to pass therethru, depending on in what direction the air attacks the wing.

Figure 10:
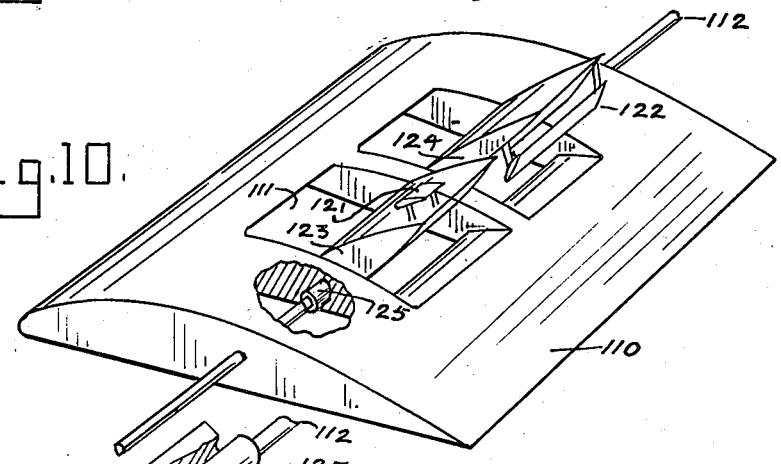
Figure 11:
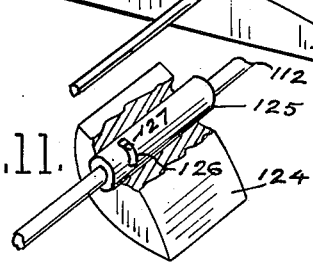

In the accompanying drawings Fig. 1 shows a fore and aft section of a wing having a cambered top surface and a concavo-convex bottom surface and double front and rear vanes with fingered edges; Fig. 2, a perspective view of a vane in larger scale provided with feathered edges; Fig. 3, a fragmentary top plan view of a wing with front and rear vanes; Fig. 4, a fragmentary perspective view of the leading edge of a wing with vanes positioned as in large angle of attack and with damping or friction arrangement; Fig. 5 is a detail of the friction device; Figs. 6 to 9 are fore and aft sections of my controlled wing construction having the vanes placed in openings in the middle of the main wing and functioning to close said openings during normal flight, but automatically providing air passages of varying width during abnormal conditions; Fig. 10 is a perspective view, partly in section showing the vanes in open position; and Fig. 11 is a fragmentary perspective view showing the mounting of a vane on a shaft to permit limited free movement thereof.

In Fig. 1 the wing 95 is cambered on its upper side and slightly concaved on the under side near its trailing edge 96 from which arms 97 extend rearwardly to carry the spindle 98 for the vane 99 with an auxiliary member 100 secured in spaced relation below the main vane 99 which may be provided with a feathered edge 102, see also Figs. 2 and 3. A stop 103 is furnished on the arm 97 between the two vane members 99 and 100 to limit the free swing of the same. To prevent a too easy swing of the vanes in either direction I provide a friction device which may consist of a compression spring 40 around the spindle 98 to act as a damper by exerting axial thrust on the vane 99 by the aid of friction disks 34 as best seen in Fig. 5.

Adjacent the leading edge 104 of the wing 95 is pivoted at 105 a front vane 106 with a smaller auxiliary vane member 107 rigidly mounted below the former. The swing of the vane is limited by a stop 108. It should be noted that gaps are provided both in front and rear of the main wing which are changed automatically in width by said vanes to suit different conditions of flight.

The vanes may be provided with feathered edges 52 and 109 as seen in Fig. 2 used on one or both edges. These are preferably made of sheet metal or other flexible material and fingered as indicated.

In Fig. 3 is shown a wing 75 provided with vanes 78 and 82 both in front and rear with the respective pivot axes 76 and 77. The forward vane 78 has an auxiliary member 79 rigidly mounted thereon in spaced relation thereto. The rear edge of the vane member 78 just clears the leading edge of the wing when turning and a horn 81 provides a stop to limit such turning. The rear vane 82 has a top member 83 mounted in spaced relation thereon on forwardly directed arms 85 so that they overlap the trailing edge 92 of the wing 75. The front and rear edges 86 and 87 are shown feathered and fingered.

Numeral 25, Fig. 4 designates the nose of an airplane wing having arms 28 projecting forwardlly from the blunt leading edge 29 and on which is pivoted as at 41 one or more vanes 30 freely movable within certain limits. When the angle of attack changes the aerodynamic characteristics will cause the rear end of the vane to turn up until restrained by the stop 31 thereby creating a slot 32 thru which air current will pass. The vane here consists of a main member 30 and an auxiliary member 33 rigidly secured on top of the former to assist in lifting the main member 30. In order to prevent a too easy swinging of the vane, I may furnish a compression spring 40 around the spindle 41 to act as a damper by exerting axial thrust on the vane. This is best shown in Fig. 5.

In Fig. 6 the main wing member 110 is provided with one or more openings 111 about midway between its leading and trailing edges and in which is pivoted on a spindle 112 a vane 113 adapted to oscillate freely within certain limits. It is here shown in almost closed position by full lines as for normal flight with its rear edge resting on the top surface of the main wing member; while the dotted lines indicate one of its several open positions providing air passages in front and rear of the vane. Numeral 114 is a stop in the form of a hook to limit the upward swing of the vane 113.

Figure 7:
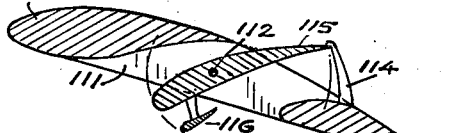

Fig. 7 shows a similar wing 110 as in quick starting or abrupt ascending position and with a double vane comprising a main member 115 and an auxiliary member 116 secured rigidly on the under side of the former in spaced relation thereto. This double vane is journaled on a spindle 112 and shown in open or raised position in the opening 111 stopped by the hook 114. It will now be seen that the air flowing by will exert a more even pressure over the entire upper surface of the wing 110 caused by the air passing thru the opening 111 guided by the vane 115, thus facilitating the rise of the airplane.

Figure 8:
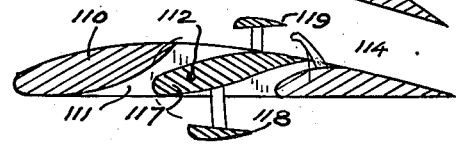

Fig. 8 shows a main wing member 110 with a triple vane mounted to swing on a spindle 112 in the opening 111. The vane member 117 carries two stabilizing blades 118 and 119, one mounted rigidly below and the other above the member 117 which is here shown in half open position. In its closed position the vane member 117 rests with its rear edge on the top surface of the wing while the swing to open is limited by a stop 114.

Figure 9:
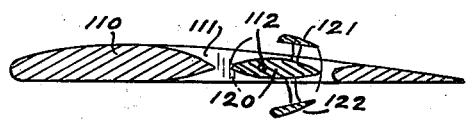

In Fig. 9 the main wing 110 is provided with a triple bladed vane, arranged substantially symmetrically around its central plane running thru the axis of its spindle 112. Its main member 120 carries fixedly on top and bottom the stabilizing blades 121 and 122 which are all adapted to swing clear with their rear edges of the opening 111 wherein the vane is mounted. No special stops are here needed because the blades 121 and 122 will strike the main wing 110 forward of the openings 111 thus preventing the vane from turning completely round.

It is evident that any number of openings 111 may be provided thru the main wing 110 and two such openings are shown in Fig. 10 each with a vane 120, here indicated in open position and mounted to oscillate on a spindle 112 running thru the main wing 120, 123 or 124 which has a tube 125 fastened therein and provided with a circumferential slot 126 in which engages a stop pin 127 secured in the spindle 112; see also Fig. 11. This permits the vane to turn freely on the shaft 112 in the wing opening 111 an amount limited by the length of the slot 126 and actuated solely by air pressure and not by hand or any mechanism.

All the different forms of vanes described herein are preferably provided with a friction device in order to slightly retard the oscillation of the vanes.

It is evident that many changes in the details and construction of the device may be made under the scope of the claims, and that any number of auxiliaries may be used.

I claim:

1. In an aerodynamically controlled wing, the combination with a main wing member, of vanes pivoted adjacent one edge of said member, means for limiting the free oscillation of the vanes comprising stops placed at the extreme deflected position of the vanes, and friction elements acting to partly resist such deflection at intermediate positions.

2. In an aerodynamically controlled wing as described in claim 1, feathered edges being provided on the vanes.

3. In an aerodynamically controlled wing as described in claim 1, fingered, feathered edges being provided on the vanes.

4. In an aerodynamically controlled wing, the combination with a main wing member, of vanes pivoted adjacent one edge of said member and adapted to permit flow of fluid around all sides of the vanes, and means, comprising suitable friction elements, adapted to partly resist the free oscillation of the vanes.

5. In an aerodynamically controlled wing as described in claim 4, auxiliary blades fixed in spaced relation on said vanes.

6. In an aerodynamically controlled wing, the combination with a main wing member, of vanes pivoted adjacent the trailing edge of said member and adapted to permit flow of fluid around all sides of the vanes during deflected position of the vanes, and means, comprising suitable friction elements, adapted to partly resist the free oscillation of the vanes.

In testimony whereof I affix my signature.

LOUIS H. CROOK.